Dec. 9, 1969  B. I. DAVIS ET AL  3,482,417
APPARATUS FOR CHILLING SAUSAGE LINKS
Filed June 6, 1968  2 Sheets-Sheet 1
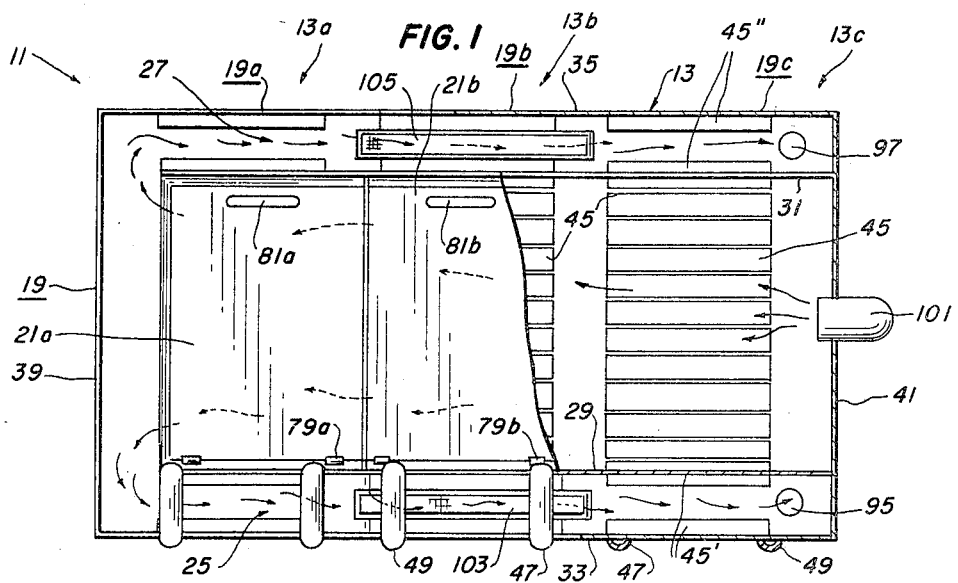
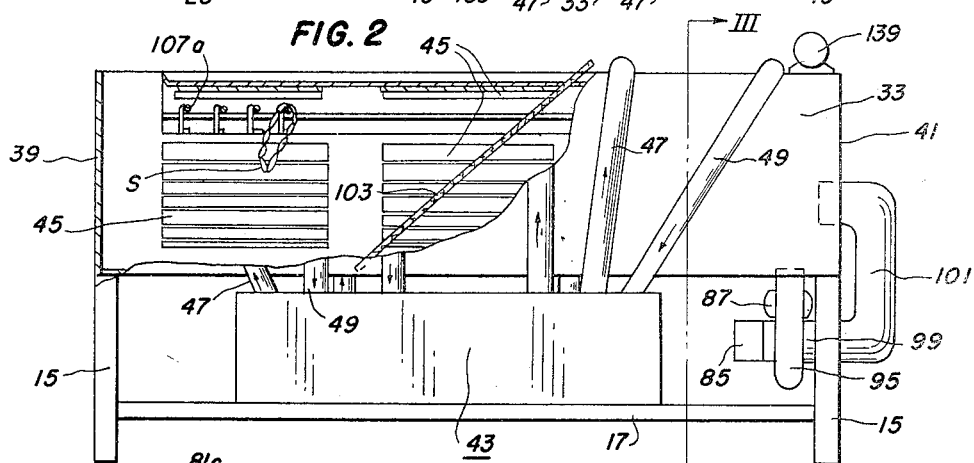
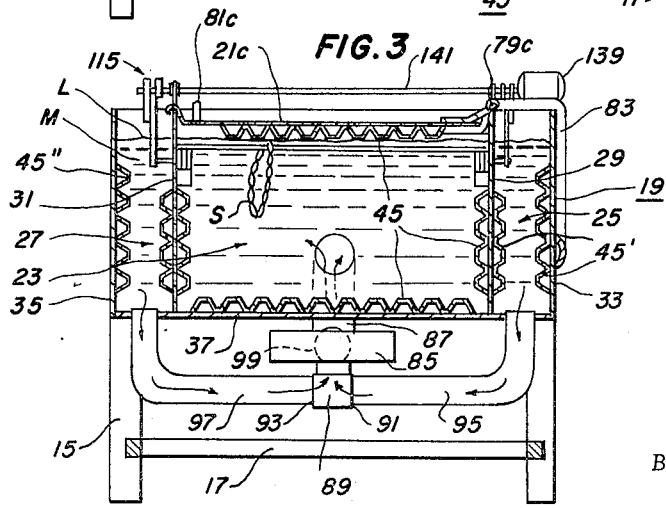
INVENTORS
BENJAMIN I. DAVIS
THOMAS A. KLYCE
BY John R. Walker, III
Attorney Dec. 9, 1969   B. I. DAVIS ET AL   3,482,417
APPARATUS FOR CHILLING SAUSAGE LINKS
Filed June 6, 1968   2 Sheets-Sheet 2
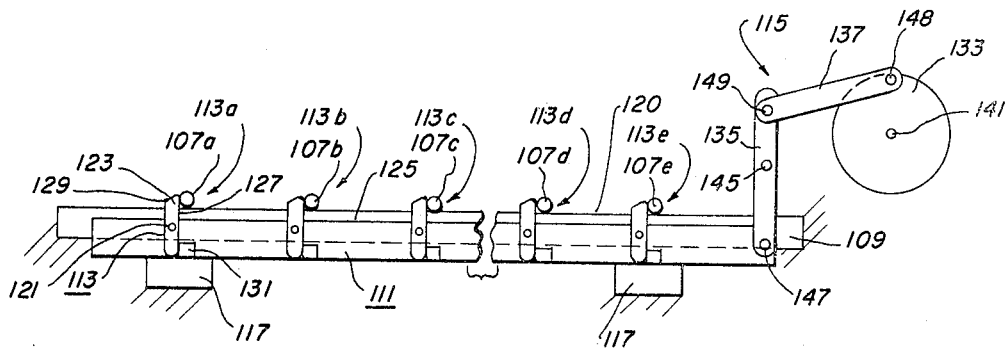
FIG. 4
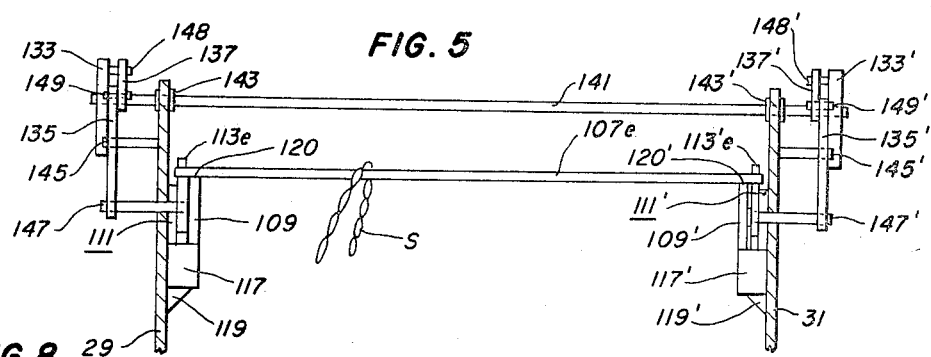
FIG. 5
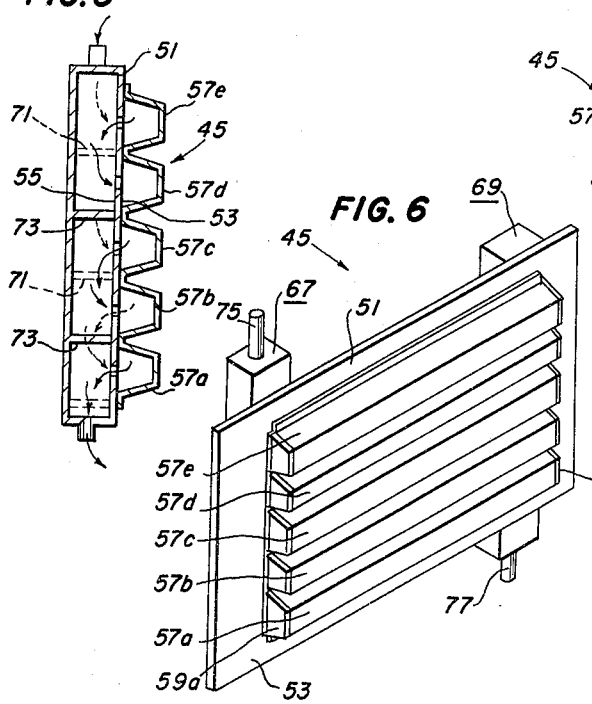
FIG. 8
FIG. 6
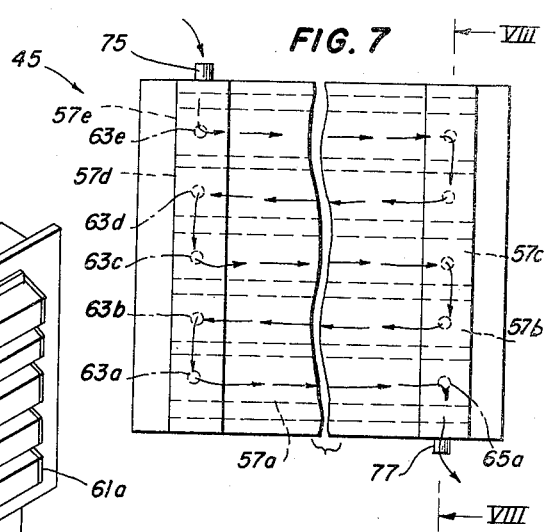
FIG. 7
INVENTORS
BENJAMIN I. DAVIS
THOMAS A. KLYCE
BY John R. Walker, III
Attorney

United States Patent Office 3,482,417
Patented Dec. 9, 1969

3,482,417
APPARATUS FOR CHILLING SAUSAGE LINKS
Benjamin I. Davis, Ellendale, and Thomas A. Klyce, Memphis, Tenn., assignors to Ranger Tool Co., Inc., Ellendale, Tenn., a corporation of Tennessee
Filed June 6, 1968, Ser. No. 735,033
Int. Cl. F25d *17/02, 25/00*
U.S. Cl. 62—375        9 Claims

ABSTRACT OF THE DISCLOSURE

Linked sausage cooling apparatus including a long deep tank adapted to be filled with refrigerated water or other cooling medium—a linked sausage chain is draped over a horizontal rod and the sausages and rod adapted to be submerged in the refrigerated water and bridgingly supported transversely across the tank—a pair of horizontal oscillating pitman bars, each bar having a series of pawl members, is adapted to engage opposite end portions of the sausage-chain-supporting rod, and by oscillation of the pitman bars, to move or relay the sausage-laden rod from one pair of pawl members to a succeeding pair of pawl members. This action being operative for conveying the sausage chain through the refrigerated water from the head to the discharge end of the apparatus from whence the sausage rod and sausages are removed from the water for further processing.

BACKGROUND OF THE INVENTION

Field of the invention

The invention relates to food processing generally and particularly relates to production line manufacturing processing generally and particularly relates to production line manufacturing processes utilized for cooling meats or the like for further processing.

Description of the prior art

Heretofore, in link sausage manufacture, the typical practice has been to link and cook the sausages one day and allow this batch of sausages to soak and cool for a specified period, as overnight in a refrigeration room for further processing the next day. In certain frankfurter manufacturing procedures, the frankfurters are marketed with the casings removed and the meat of each link being separated; after a batch of link sausages were linked and cooked, the cooked sausages were cooled prior to being peeled for packaging. In order for the sausage peeling machine to perform properly the temperature of the sausages must be accurately controlled; it has been discovered that the temperature of the sausages as they go through the peeled machine is very significant to proper peeling of the sausages. Heretofore, it has been very difficult to control the temperature of the sausages within a desired heat range.

Various devices have been developed for cooling or refrigerating foods or food items: Patent No. 2,461,375 illustrates a machine adapted for freezing ice cream, custards, and other food products wherein the temperature is brought below freezing. In the device of this patent, ice cream containers are placed in a tank of brine water and the ice cream containers are slid along the tank bottom by a periodically operative chain and drag assembly. A significant problem with food cooling apparatus such as this is that it is not operative for continuous food processing or such apparatus is not continuously operative.

Patent No. 3,004,407 illustrates a chiller apparatus for continuously chilling poultry or the like and this apparatus may be used in an assembly line process: A series of paddles mounted on an endless chain are adapted to move the poultry product through a tank and lift the product from the tank for further processing. A problem with devices such as this is the tendency of the food items to bunch together or to be bruised or damaged as they are being conveyed through the liquid refrigerant. This problem is believed to be of particular significance should a device such as this be utilized for chilling frankfurters or other small food items.

SUMMARY OF THE INVENTION

The present invention, although particularly directed for use in chilling linked sausages, is also perhaps useful in chilling other small food items. The apparatus of the present invention is useful for continuous processing of food and for use in factories or assembly line food processing. A sausage chain as it is removed from a sausage cooker is adapted to be placed on a horizontal rod and the rod and sausages moved intermittently through the chilling tank. The sausages are hung or draped over a sausage rod in such a manner as not to be in a bunch or in close contact with each other and thus allows free circulation of the cooling liquid medium around each sausage link. The sausages are suspended freely in the chill tank and there is no likelihood of the sausages being dragged across the bottom or being mangled or bruised by the conveying. Also, the sausages may be handled substantially by handling the sausage rods which are used in previous operations and thus reduces human contact with the sausage food product. Handling the sausages by the sausage rod means thus promotes cleanliness and sanitary conditions in the sausage processing plant.

BRIEF DESCRIPTION OF THE DRAWING

FIG. 1 is a top plan view of the sausage chilling apparatus of the present invention with parts broken away for purposes of clarity.

FIG. 2 is a side elevational view of the sausage chilling apparatus of FIG. 1 with parts broken away for purposes of clarity.

FIG. 3 is a vertical plane sectional view taken as on the line III—III of FIG. 2.

FIG. 4 is a schematic showing of the means for conveying the sausages through the cooling medium.

FIG. 5 is a schematic showing taken substantially transversely of the view of FIG. 4 and illustrating additional parts of the machine utilized for conveying the sausages through the cooling medium.

FIG. 6 is a perspective view of one of the cooling units utilized for cooling the water or cooling medium in the chilling tank.

FIG. 7 is a schematic showing of the cooling unit illustrating the flow of refrigerant through the unit.

FIG. 8 is a vertical plane sectional view taken as on the line VIII—VIII of FIG. 7.

DESCRIPTION OF THE PREFERRED EMBODIMENT

The sausage cooling apparatus of the present invention is indicated by numeral 11 and includes a rectangular tank means 13 supported on legs 15 and horizontal leg bracing 17. Tank means 13 preferably is formed in three sections including sections 13a, 13b, 13c defined respectively by tank body sections 19a, 19b, 19c and tank lids 21a, 21b, 21c.

Tank body 19 includes wall means defining a generally long main chamber 23 extending longitudinally in tank body 19 and left and right secondary chambers 25, 27 arranged respectively on opposite sides of main chamber 23. Chambers 23, 25, 27 are defined substantially by vertical longitudinally extending walls 29, 31, 33, 35 secured to and extending upwardly from a horizontal bottom wall 37, and a head wall 39 and tail wall 41 fixedly secured right angularly respectively to side walls 33, 35. In plan view, chambers 23, 25, 27 are arranged generally in an E configuration.

Tank body 19 is adapted to be filled with water or other cooling medium liquid M to the level L as indicated in FIG. 3. The means for refrigerating cooling medium M preferably includes a compressor-condenser unit 43 and a plurality of cooling units including main chamber cooling units 45 and left and right secondary cooling units 45′, 45″ respectively. Feed and return conduits 47, 49 interconnect respectively compressor-condenser unit 43 with cooling units 45, 45′, 45″. Compressor-condenser unit 43 is adapted to continuously cyclically furnish refrigerant medium through conduits 47, 49 and energize cooling units 45, 45′, 45″.

FIGS. 6–8 illustrate a preferred embodiment of a cooling unit—a cooling unit 45 being illustrated and described and will suffice as a description for units 45′, 45″: Cooling unit 45 is generally flattened in form and includes a vertical plate-like frame 51 having front and back sides 53, 55. A plurality of horizontally extending tubular cells 57a, 57b, 57c, 57d, 57e are arranged in a vertically spaced series along front 53 of frame 51. Each cell is generally U-shaped in transverse section and opposite edge portions are sealingly secured respectively on front surface 53 of frame 51. Opposite end portions of each tubular cell is plugged as by plugs 59a, 61a, of tubular cell 57a. Each tubular cell is defined partially by the flat front surface 53 of frame 51. Each tubular cell is provided with a small-diametered inlet and outlet opening at the respective opposite end portions of the cell and extending respectively through frame 51 as openings 63a and 65a of tubular cell 57a. The inlet and outlet openings extending through frame 51 are arranged respectively alternatingly in a vertically extending series of openings arranged on opposite end portions of frame 51. Referring to FIG. 7, it will be noted that the apertures on the left side of this figure are arranged alternatingly, and that opening 63e is an inlet opening for tubular cell 57e; opening 63d is an outlet opening for tubular cell 57d; opening 63c is an inlet opening for tubular cell 57c and so on throughout the remainder of the tubular cells.

On the back side of cooling unit plate 51 is arranged a vertically extending pair of box-like partitioned manifold members 67, 69 operative for conducting the refrigerant of compressor-condenser unit 43 through the tubular cells of unit 45. Manifolds 67, 69 are sealingly fixedly secured respectively on back surface 55 of opposite end surface portions of frame 51 and respectively over vertically arranged inlet and outlet openings respectively of tubular cells 57a, 57b, 57c, 57d, 57e. Partition portions 71, 73 respectively are so arranged in manifolds 67, 79 in such a manner as to conduct fluid back and forth throughout the vertical extension of cooling unit 45 and alternatingly in one direction and the other direction in adjacent tubular cells 57a, 57b, 57c, 57d, 57e. Refrigerant medium from compressor-condenser unit 43 enters cooling unit 45 through inlet 75, passes back and forth and alternatingly through the tubular cells of unit 45, passes out through outlet 77 and returns to compressor-condenser unit 43. Arrows in FIGS. 7 and 8 show the flow of the refrigerant medium through cooling unit 45.

Lids 21a, 21b, 21c are pivotally secured by hinges 79a, 79b, 79c on the upper edge portions respectively of wall 29 of tank body 19 and provide displaceable cover means for main chamber 23. Handles 81a, 81b, 81c secured respectively on lids 21a, 21b, 21c provide hand grip lift means for pivotally opening the lids and main chamber 23. Each lid 21a, 21b, 21c preferably is provided with a cooling unit 45 connected through flexible refrigerant line means 83 to compressor-condenser unit 43.

Apparatus 11 includes means for continuously circulating cooling medium liquid M through tank body 19.

Pump and conduit means provide means for casing cooling medium M to circulate or flow simultaneously continuously through main and secondary chambers 23, 25, 27 of tank body 19: A centrifugal pump 85 is mounted horizontally under the tail portion of tank body 19 and is driven by an electric motor 87. Pump 85 is provided with an inverted T connection 89 defining respectively left and right intake ports 91, 93 (see FIG. 3). Left and right conduit means 95, 97 communicate the tail portion respectively of left and right secondary chambers 25, 27 respectively with intake ports 91, 93 of pump means 85. The exhaust port 99 of pump 85 is connected through exhaust or supply conduit 101 to the tail portion of main chamber 23.

With pump means 85 operative, cooling medium M is drawn from the head portions respectively of left and right secondary chambers 25, 27 and into intake ports 91, 93 of pump means 85. The cooling medium is moved through the pump and forced out of supply conduit 101 into the tail portion of main chamber 23. The forced medium liquid issuing from supply conduit 101 causes the fluid in main chamber 23 to move forward and against head wall 39 of tank body 19 and oppositely and back down secondary chambers 25, 27 to again enter intake conduits 95, 97. (The flow of cooling medium M is indicated by arrows in FIGS. 1 and 3.) As the cooling medium is moved cyclically continuously through tank body 19, cooling units 45, 45′, 45″ respectively in main, and left and right secondary chambers of the tank means cools and maintains the liquid medium at a desired temperature.

Filtering means preferably is provided in left and right secondary chambers 25, 27 respectively for filtering foreign matter from cooling medium M as it is circulated through tank body 19. Framed screen members 103, 105 preferably are removably fitted snugly respectively in left and right secondary chambers 25, 27. Screens 103, 105 preferably are arranged obliquely in the flow of cooling medium M in chambers 25, 27 and strain foreign matter from the cooling medium as it is conducted rearwardly and toward intake conduits 95, 97.

The means for conveying the link sausages (indicated S) through the cooling medium contained in tank 19 basically includes a plurality of sausage rods 107a, 107b, 107c, 107d, 107e; a pair of side rails including left and right rails 109, 109′; a pair of pitman bars including left and right pitman bars 111, 111′; a plurality of pawl mechanisms 113a, 113b, 113c, 113d, 113e intermittently arranged along pitman bar 111; and means 115 for moving left and right pitman bars 111, 111′ equidistantly simultaneously back and forth in translational oscillating movement.

Slide rails 109, 109′ each are long, and rectangular in transverse section and are fixedly secured horizontally along the upper portions respectively of main chamber parallel walls 29, 31. Block and gusset means 117, 117′, 119, 119′ opposingly arranged and fixedly secured on opposite interior surfaces respectively of walls 29, 31 provide means for stationarily supporting slide rails 109, 109′ in parallel spaced arrangement within the interior of main chamber 23. The lower horizontal edge portions respectively of rails 109, 109′ are fixedly secured along the upper surfaces respectively of blocks 117, 117′ and provide rigid support means for rails 109, 109′. The upper horizontal surfaces 120, 120′ respectively of slide rails 109, 109′ are coplanar arranged and adapted to support in parallel arrangement sausage rods 107a, 107b, 107c 107d, 107e.

Each sausage rod 107a, 107b, 107c, 107d, 107e is adapted to support a chain of sausages S and to support the sausages submerged in cooling medium M as the sausages are moved through main chamber 23 of tank body 19. A series of sausage rods are adapted to be placed, one rod at a time, on the forward end of slide rails 109, 109' and to be relayed from one pair of pawl mechanisms 113a, 113'a to a succeeding pair of pawl mechanisms 113b, 113'b and so on in relay, or intermittent fashion throughout the full length of tank body main chamber 23. Each sausage rod is adapted to be loaded with sausage links and placed transversely and bridgingly between parallel rails 109, 109' and the opposite end surfaces of each sausage rod being adapted to be slidingly moved toward the tail of the apparatus as the sausages are moved through the tank means main chamber 23.

Each pair of pawl mechanisms (113a,113'a) is alike, the difference being only that the left and right mechanisms are oppositely configured. For purposes of clarity a single pawl mechanism, mechanism 113a of pitman bar 111 will be described, if of course being understood that the remaining pawl mechanisms are also of similar construction and operation: Pawl mechanism 113a includes a bar-like pawl member 113 pivotally secured at its medial portion to pitman bar 111 by a horizontal pin 121 pivotally securing pawl member 113 along the outer edge surface of pitman bar 111. Pawl member 113 normally is arranged in a substantially vertical disposition and with its upper or dog end portion 123 projecting above upper edge surface 125 of pitman bar 111. Dog portion 123 of pawl member 113 has a vertical check surface 127 and an obliquely extending pass surface 129 facing oppositely and respectively rearwardly and forwardly relative to pitman bar 111.

Pitman bar 111 is guidingly constrained for translational back and forth movement between main chamber vertical wall 29 and slide rail 109. The undersurface of pitman bar 111 is adapted to slide back and forth on the upper surfaces of blocks 117 and carry pawl mechanism 113a toward the head and tail portions of tank means 13. Pawl member 113 is adapted to be translationally moved by pitman bar 111, underneath a sausage rod 107, and to cause pass surface 129 to engage the left end portion of a sausage rod 107. Continued movement of pitman bar 111 toward the head end of the apparatus causes pawl member 113 to be pivoted clockwise and to move beneath sausage rod 107. After mechanism 113a has moved fully past rod 107, and is on the forward side of the rod, the weight on the lower portion of pawl member 113 causes the pawl member to assume a vertical disposition and to arrange check surface 127 for engagement with rod 107 as mechanism 113a is carried toward the tail portion of the apparatus.

A block-like stop 131 is fixedly secured on the outer face surface of pitman bar 111 and serves to stop the counterclockwise rotation of pawl member 113 as the pawl mechanism is carried toward the tail portion of the apparatus. Stop 131 stops pawl member 113 in a vertical disposition and in such a disposition that check surface 127 of pawl member dog portion 123 engages the left end portion of a sausage rod 107 and urges that end of the rod slidingly along horizontal slide surface 120 of slide rail 109. The weight of the lower end portion of pawl member 113 serves to pivotally urge the pawl member counterclockwise and toward a stopped vertical disposition and into engagement with stop 131. It will, of course, be understood that pawl mechanism 113a, and 113'a act simultaneously and that the pawl member of pawl mechanism 113'a simultaneously engages the right end of rod 107 as pawl member 113 of mechanism 113a engages the left end of the rod; the pawl members respectively of pawl mechanisms 113a, 113'a simultaneously engage opposite end portions of a sausage rod and slidingly convey the rod along slide rails 109, 109'.

The means 115 for moving pitman bars 111, 111' equidistantly simultaneously back and forth includes basically left and right crank members 133, 133'; rocker arms 135, 135'; link members 137, 137' and motor means 139. Crank members 133, 133' are fixedly secured on opposite end portions of a shaft 141 horizontally secured in bearings 143, 143' supported respectively in vertical walls 29, 31 of main chamber 23 of tank body 19. Pivot pins 145, 145' extending respectively through the intermediate portion of rocker arms 135, 135' and fixedly secured respectively in vertical walls 29, 31 pivotally secure rocker arms 135, 135' for oscillatory movement fore and aft relative to tank means 13. Horizontal pins 147, 147' extending respectively through the lower end portions of rocker arms 135, 135', through arcuate slots in walls 29, 31, and through the rearward portions respectively of pitman bars 111, 111' transmit motion from the rocker arms to pitman bars 111, 111'. If desired, rocker arms 135, 135' may be placed on the inner sides of walls 29, 31 and pitman bars 111, 111' may be placed on the inner sides of slide rails 109, 109', without departing from the spirit and scope of the present invention. Link members 137, 137' are pivotally connected respectively at opposite end portions, to crank pins 148, 148' of crank members 133, 133' and pins 149, 149' pivotally secured to the upper end portions of rocker arms 135, 135'. Motor means 139 is operatively connected by suitable means (not shown) to shaft 141 and provides power means for oscillatory movement of pawl-member-bearing pitman bars 111, 111'.

In the operation of apparatus 11, a sausage link loaded rod 107 is adapted to be placed on the forward end portions respectively of slide rails 109, 109' and by intermittent oscillating movement of pitman bars 111, 111' to be relayed from first pair of pawl mechanisms 113a, 113'a to second pair of pawl mechanisms 113b, 113'b and in consecutive order throughout the full number of pairs of pawl mechanisms; a loaded sausage rod is adapted to be relayed successively from one pair of pawl mechanisms to the succeeding pair of pawl mechanisms and in a direction toward the tail of the sausage chilling apparatus. As one sausage-link-bearing sausage rod is moved from pawl mechanisms 113a, 113'a to the succeeding pair of mechanisms 113b, 113'b, another sausage rod having thereon a load of sausage links is placed on the head end portions respectively of slide rails 109, 109' rearward of pawl mechanisms 113a, 113'a. Upon the completion of the succeeding cycle or following oscillation, the second rod will be moved toward the tail of the apparatus and will be engaged by a succeeding pair of pawl mechanisms. Sausage-link-loaded rods 107 are placed on the head end portions of slide rails 109, 109' and, after being intermittently moved or relayed toward the tail portion of the apparatus, the rods and sausages are removed and the rods may be re-used again for supporting other sausage links.

While we have shown and described a preferred embodiment of the invention, it will of course be understood that various modifications and changes in structure may be made without departing from the scope of the invention as defined in the appended claims.

We claim:

1. Apparatus for chilling chained sausage links comprising tank means including a long deep tank body having head and tail portions, said tank body being adapted to contain a large quantity of water or cooling medium liquid, means for refrigerating said cooling medium liquid means for conveying the sausage link chain through said cooling medium from the head to the tail of said tank body including a parallel arranged pair of slide rails stationarily secured each rail along a side of the tank body, and each rail having an upwardly facing horizontally extending slide surface, each surface being coplanar arranged with the other surface, a plurality of long narrow sausage rods, each rod being adapted to receive and support a chain of sausage links draped or looped over said rod, each sausage rod being loaded with a sausage chain and bridgingly disposed across and between said pair of parallel rails with the opposite end portions of said bar restingly engaging the slide surfaces respectively of said left and right slide rails and with each sausage chain being submerged and below the surface of the water in the tank body, and motor driven means for moving said rods to slide said rods along said slide surfaces and carry the sausage chains through the water from the head portion to the tail portion of said tank means.

2. Apparatus for chilling chained sausage links comprising tank means including a long deep tank body having head and tail portions, said tank body being adapted to contain a large quantity of water or cooling medium liquid, means for refrigerating said cooling medium liquid, means for conveying the sausage link chain through said cooling medium from the head to the tail of said tank body including a parallel arranged pair of slide rails stationarily secured each rail along a side of the tank body, and each rail having an upwardly facing horizontally extending slide surface, each surface being coplanar arranged with the other surface, a plurality of long narrow sausage rods, each rod being adapted to receive and support a chain of sausage links draped or looped over said rod, each sausage rod being adapted to be thus loaded with a sausage chain and bridgingly placed across and between said pair of parallel rails with the opposite end portions of said bar restingly engaging the slide surfaces respectively of said left and right slide rails and with each sausage chain being submerged and below the surface of the water in the tank body, and means for moving said rods to slide said rods along said slide surfaces and carry the sausage chains through the water from the head portion to the tail portion of said tank means; including flow means for circulating the cooling liquid medium in said tank body including wall means in said tank body defining a generally long main chamber and left and right long secondary chambers arranged respectively on opposite sides of said main chamber, said left, right and main chambers extending respectively longitudinally and each having head and tail portions, the tail portions of said main, left and right chambers being occluded in a direction toward said tail of said tank body, the head portions of said main, left and right chambers being connected together and in plan view, said main, right and left chambers being arranged generally in an E configuration; and including means for continuously moving the cooling medium liquid through said main, left and right chambers including powered pump means having left and right intake ports and a single exhaust port, left and right conduit means communicating the head portions respectively of said left and right chambers to said left and right intake ports, and exhaust conduit means communicating the head portion of said main chamber with said exhaust port of said pump means, the cooling medium liquid being moved cyclically continuously from said pump means through said eyhaust conduit means, through said main chamber in a direction toward the head portion, through said left and right chambers and said left and right intake conduit means, and back through said pump means.

3. The apparatus of claim 2 wherein said means for refrigerating said cooling medium liquid includes a compressor-condenser refrigeration unit adapted to refrigerate a refrigerant and includes a plurality of cooling units, each arranged respectively in said main, left and right chambers for receiving the refrigerant from said compressor-condenser unit and for cooling the cooling medium liquid in said main, left and right chambers of said tank body.

4. The apparatus of claim 3 wherein each cooling unit is generally flattened in form and includes structure defining a juxtaposedly arranged series of longitudinally extending tubular cells each having a front and a back side and each being closed at its opposite ends except for a substantially small-diametered inlet and outlet opening on the back side of each said cell, each cooling unit including manifold structure arranged respectively on the back sides of said series of cells, respectively at opposite ends of said tubular cells, and alternatingly connecting said inlet and outlet openings of adjacent tubular cells.

5. Apparatus for chilling chained sausage links comprising tank means including a long deep tank body having head and tail portions, said tank body being adapted to contain a large quantity of water or cooling medium liquid, means for refrigerating said cooling medium liquid, means for conveying the sausage link chain through said cooling medium from the head to the tail of said tank body including a parallel arranged pair of slide rails stationarily secured each rail along a side of the tank body, and each rail having an upwardly facing horizontally extending slide surface, each surface being coplanar arranged with the other surface, a plurality of long narrow sausage rods, each rod being adapted to receive and support a chain of sausage links draped or looped over said rod, each sausage rod being adapted to be thus loaded with a sausage chain and bridgingly placed across and between said pair of parallel rails with the opposite end portions of said bar restingly engaging the slide surfaces respectively of said left and right slide rails and with each sausage chain being submerged and below the surface of the water in the tank body, and means for moving said rods to slide said rods along said slide surfaces and carry the sausage chains through the water from the head portion to the tail portion of said tank means; said means for moving said rods including left and right pitman bars each bar being guidingly constrained in translational movement toward and away from the head and tail portions of said tank body and with each pitman bar being guidingly constrained and arranged each parallel and slightly below respectively said slide surfaces of said left and right slide rails, means for moving said left and right pitman bars equidistantly simultaneously back and forth in translational oscillating movement toward and away from the head and tail of said tank body, and including a plurality of pairs of pawl mechanisms with each said pair of pawl mechanisms including respectively a left and right pawl member mounted respectively on said left and right pitman bars, each pair of pawl members being arranged generally in a common vertical plane lying perpendicular respectively to said left and right slide rails, said plurality of pairs of pawl members being intermittently arranged along said pitman bars and beginning at the head end of the apparatus and toward the tail end thereof including at least a first and a second pair of pawl members, each pawl member having an upwardly projecting dog portion normally projecting above the horizontal plane of the slide surface of a respective slide rails and with said dog portion of each pawl member being adapted to be downwardly displaced upon engagement with an end portion of a sausage link loaded rod of said plurality of sausage rods; back and forth oscillatory simultaneous movements of said left and right pitman bars being adapted for simultaneously moving a pair of pawl members in a direction towards the head of said apparatus; the dog portions of said pair of pawl members being adapted to engage and pass under respective opposite end portions of a sausage link loaded rod, the pawl members being adapted to catch said rod and, upon movement of said pair of pawl members toward the tail of said apparatus, to slidingly move said rod to a position for engagement by a succeeding pair of pawl members on the succeeding oscillation of said last-mentioned pair of pawl members a loaded sausage rod being adapted to be relayed successively from one pair of pawl members to another pair of pawl members and in a direction toward the tail of said sausage chilling apparatus.

6. The apparatus of claim 5 wherein each pawl mechanism includes an elongated pawl member, pin means pivotally supporting said pawl member from a respective pitman bar and on a horizontal pivot axis extending perpendicular to said pitman bar and including means for pivotally arranging said pawl member normally in a generally vertical disposition with said pawl member dog portion projecting upwardly and in a position above the plane of the horizontal slide surfaces of said left and right slide rails, said pawl member dog portion having a check surface and a pass surface oppositely facing and facing respectively toward the tail and head of said tank body, said pawl member being adapted to translationally moved by said pitman bar underneath a sausage rod by movement of said pitman arm toward the head of said tank body and in so doing to engage the pass surface of said pawl member dog portion with said sausage rod pivotally move said pawl member in a clockwise direction and underneath and out of engagement with said sausage rod, upon movement of said pitman bar towards said tail of said tank body, said catch surface being adapted to engage the sausage rod and to cause said pawl member to pivot in a counterclockwise direction; and including means for stopping the counterclockwise movement of said pawl member substantially in a vertical disposition, and including means for pivotally urging said pawl member in a counterclockwise direction and toward a stopped vertical disposition.

7. The apparatus of claim 6 wherein said means for pivotally urging said pawl member in a counterclockwise direction toward a stopped vertical disposition includes unbalanced weight means on opposite sides of the pivot axis of said pawl member with that end portion of said pawl member remote from said dog portion being substantially heavier than that end of said pawl member including said dog portion, the unbalanced weight condition of said pawl member being operative for gravitationally causing said pawl member to be pivotally urged counterclockwise and toward a stopped vertical disposition.

8. The apparatus of claim 5 wherein said means for moving said left and right pitman bars equidistantly simultaneously back and forth includes left and right crank members stationarily journaled on a common horizontal axis, each having a horizontal eccentric axis, the eccentric axes being coincident in horizontal extension, right and left vertical rocker arms stationarily journaled each at its intermediate portion on a horizontal axis common to both rocker arms, and with said axis lying perpendicular respectively to the longitudinal extension of said tank body, the lower end portions respectively of said left and right rocker arms being pivotally secured respectively to said left and right pitman bars, and including left and right link members having opposite end portions respectively pivotally connected with the eccentric axes of said left and right crank members and the upper end portion of said left and right rocker arms, and including motor means for rotating said left and right crank members in unison.

9. Apparatus for chilling chained sausage links comprising a horizontally elongated tank body adapted to contain cooling medium liquid and having head and tail portions, means defining a parallel coplanar horizontally extending pair of upwardly facing slide surfaces including a left and a right slide surface arranged respectively on the upper left and right sides of said tank body, a plurality of individual sausage rods with each rod being adapted to receive and support a sausage link chain and to be bridgingly supported on said pair of upwardly facing slide surfaces, means for moving each rod of said plurality of sausage rods on said pair of slide surfaces from the head to the tail portions of said tank body including left and right pitman bars, each bar being guidingly constrained in translational movement toward and away from the head and tail portions of said tank body and with each pitman bar being arranged parallel and slightly below respectively said left and right slide surfaces, means for moving said left and right pitman bars simultaneously back and forth in translational oscillating movement toward and away from the head and tail portions of said tank body, and including a plurality of pairs of pawl mechanisms with each said pair of pawl mechanisms including respectively a left and a right pawl member movably mounted respectively on said left and right pitman bars, said plurality of pairs of pawl members being intermittently arranged along said pitman bars, each pawl member having an upwardly projecting dog portion normally projecting above the horizontal plane of said left and right slide surfaces and with said dog portion of each pawl member being adapted to be downwardly displaced upon engagement with an end portion of a sausage link loaded rod of said plurality of sausage rods; back and forth oscillatory simultaneous movements of said left and right pitman bars being adapted for simultaneously moving a pair of pawl members in a direction toward the head of said apparatus; the dog portions of said pair of pawl members being adapted to engage and pass under respective opposite end portions of a sausage link loaded rod, the pawl members being adapted to catch said rod and upon movement of said pair of pawl members toward the tail portion of said apparatus, to move said rod to a position for engagement by a succeeding pair of pawl members on the succeeding oscillation of said last-mentioned pair of pawl members, a loaded sausage rod being adapted to be relayed successively from one pair of pawl members to another pair of pawl members and in a direction toward the tail portion of said sausage chilling apparatus.

References Cited

UNITED STATES PATENTS

| | | | |
|---|---|---|---|
| 633,733 | 9/1899 | Prince | 198—221 X |
| 2,461,375 | 2/1949 | Eftihios | 198—221 X |
| 2,723,645 | 11/1955 | Garapolo | 62—374 X |
| 3,204,844 | 9/1965 | Wallace | 198—177 X |

WILLIAM E. WAYNER, Primary Examiner

U.S. Cl. X.R.

62—382; 99—109; 198—221